(12) United States Patent
Lang

(10) Patent No.: US 9,705,113 B2
(45) Date of Patent: Jul. 11, 2017

(54) PLUG-IN SYSTEM FOR COMBINING LITHIUM-POLYMER BATTERIES AND FOR CONNECTING SAME TO FORM A BATTERY SYSTEM

(71) Applicant: Günter Lang, Wernau (DE)

(72) Inventor: Günter Lang, Wernau (DE)

( * ) Notice: Subject to any disclaimer, the term of this patent is extended or adjusted under 35 U.S.C. 154(b) by 159 days.

(21) Appl. No.: 14/731,495

(22) Filed: Jun. 5, 2015

(65) Prior Publication Data
US 2015/0357609 A1    Dec. 10, 2015

(30) Foreign Application Priority Data

Jun. 6, 2014 (DE) .......... 10 2014 008 134

(51) Int. Cl.

| | | |
|---|---|---|
| *H02J 7/00* | (2006.01) | |
| *H01M 2/10* | (2006.01) | |
| *H01M 2/20* | (2006.01) | |
| *B60L 11/18* | (2006.01) | |
| *H01M 10/48* | (2006.01) | |
| H01M 10/0525 | (2010.01) | |
| H01M 10/0565 | (2010.01) | |
| H01R 11/28 | (2006.01) | |
| H01M 10/42 | (2006.01) | |

(52) U.S. Cl.
CPC ....... *H01M 2/1016* (2013.01); *B60L 11/1818* (2013.01); *B60L 11/1877* (2013.01); *B60L 11/1879* (2013.01); *H01M 2/105* (2013.01); *H01M 2/1077* (2013.01); *H01M 2/202* (2013.01); *H01M 2/204* (2013.01); *H01M 2/206* (2013.01); *H01M 10/482* (2013.01); *H02J 7/0014* (2013.01); *H02J 7/0024* (2013.01); *H01M 10/0525* (2013.01); *H01M 10/0565* (2013.01); *H01M 2010/4271* (2013.01); *H01M 2220/20* (2013.01); *H01R 11/288* (2013.01); *Y02E 60/122* (2013.01); *Y02T 10/705* (2013.01); *Y02T 10/7072* (2013.01); *Y02T 90/14* (2013.01)

(58) Field of Classification Search
CPC ...... H02J 7/0042; H02J 7/0044; H02J 7/0045; H02J 7/355
USPC ......................................... 320/113
See application file for complete search history.

(56) References Cited

U.S. PATENT DOCUMENTS

| | | | | |
|---|---|---|---|---|
| 2006/0068272 A1* | 3/2006 | Takami | ................ | B60L 3/0046 429/62 |
| 2014/0111161 A1* | 4/2014 | Kim | ..................... | H01M 10/42 320/128 |
| 2014/0356651 A1 | 12/2014 | Ciaccio | | |

* cited by examiner

*Primary Examiner* — Arun Williams
(74) *Attorney, Agent, or Firm* — McGlew and Tuttle, P.C.

(57) ABSTRACT

A battery system includes a container with a plurality of Li—Po batteries arranged with current and balancer terminal with plug-type connections that cannot be transposed for easy assembly and disassembly and for individual transportation of batteries onboard airplanes according to regulations. A balancer plug is connected with a balancer rail with compatible jacks and with a central balancer cable. A current lead-out plug is connected with a central leading-out power cable via bus bars and with coupling elements and compatible jacks. The battery system is connected via the central balancer cable by plug-type connection to a charging station or to a consumer by a respective plug-type connection. A circuit is used as a balancer of each cell in the Li—Po batteries and is arranged in the battery housing. The power storage capacities can be adapted to the field of application by selecting the type and number of the Li—Po batteries.

7 Claims, 4 Drawing Sheets

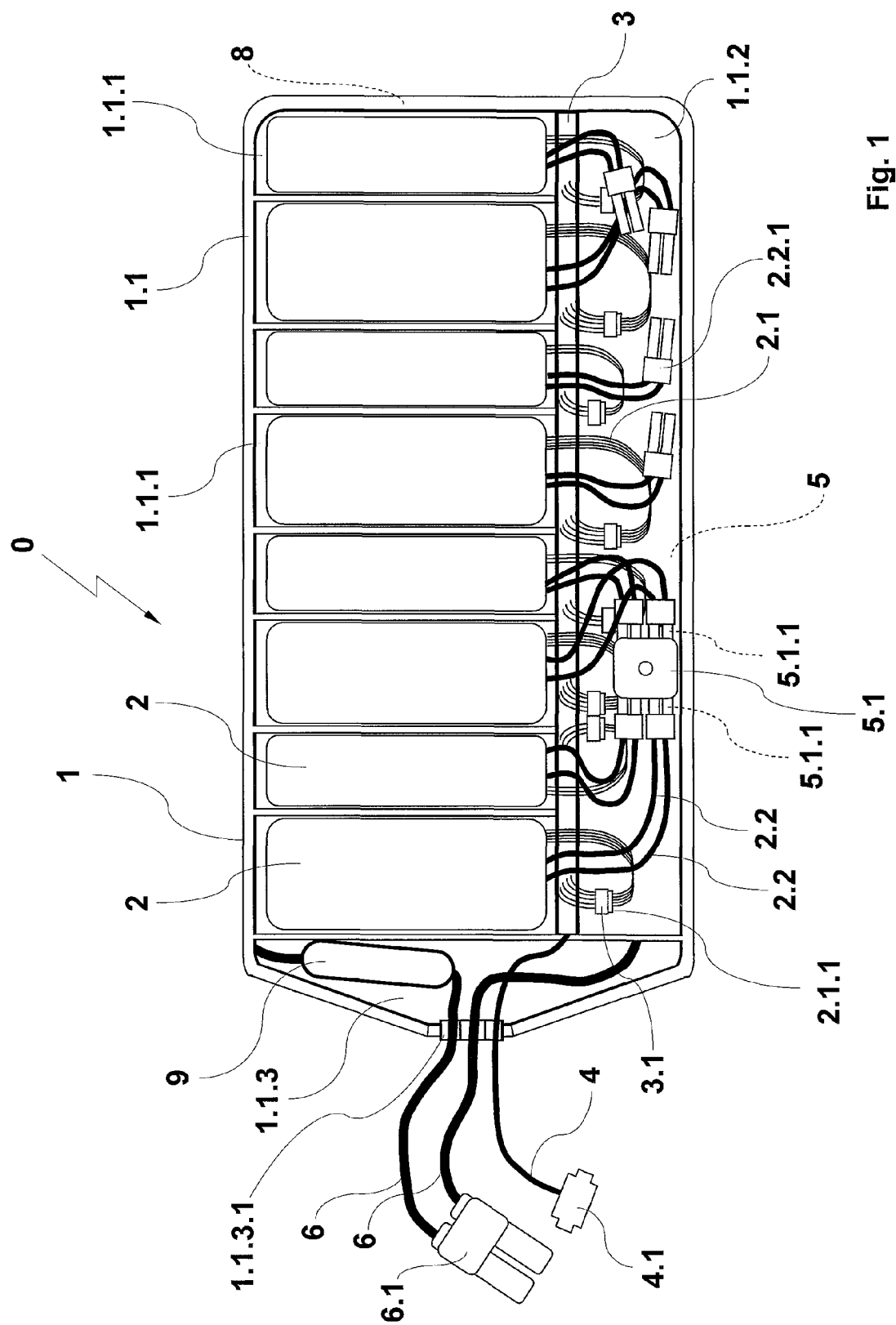

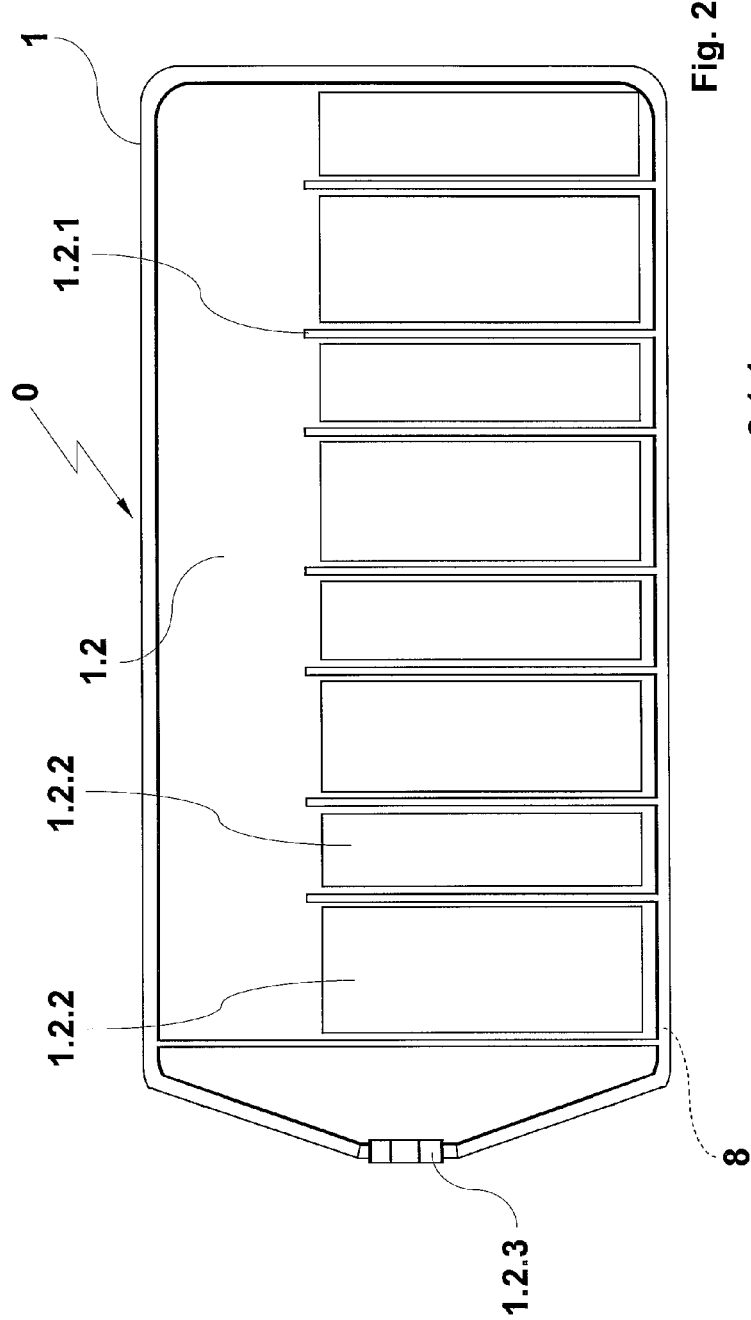
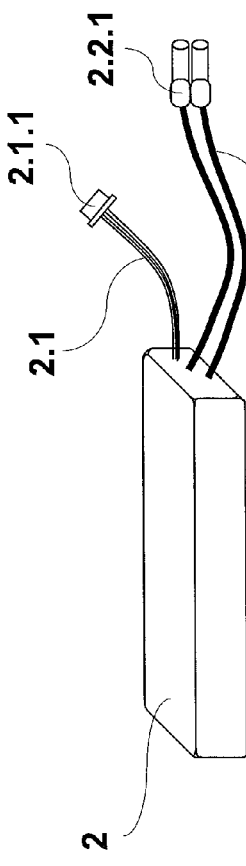

PLUG-IN SYSTEM FOR COMBINING LITHIUM-POLYMER BATTERIES AND FOR CONNECTING SAME TO FORM A BATTERY SYSTEM

CROSS REFERENCE TO RELATED APPLICATIONS

This application claims the benefit of priority under 35 U.S.C. §119 of German Patent Application DE 10 2014 008 134.6 filed Jun. 6, 2014, the entire contents of which are incorporated herein by reference.

FIELD OF THE INVENTION

The present invention pertains to a plug-in system for combining lithium polymer batteries and for connecting same to form a battery system for electrically driving a consumer, especially as a drive for electric bicycles or for retrofitting bicycles with an electric drive.

BACKGROUND OF THE INVENTION

A plurality of rechargeable battery systems with lithium polymer batteries are known, which are used to drive various consumers, for example, for driving or energizing solar-powered vehicles, electric automobiles, model airplanes and airplanes, mobile phones, MP3 players and stationary power plant energy storages devices. The lithium polymer battery is a rechargeable energy storage device, whose negative electrode consists of graphite, the positive of lithium metal oxide, and has an electrolyte, which consists of a polymer-based film ranging from solid to gel-like. These components of the battery are manufactured as laminating sheets with a thickness of less than 100 µm as round and flat cells. Since the electrolyte is bound in a gel-like polymer and is not liquid, unlike, for example, in lithium ion batteries, no solid housing is necessary to secure the technical structures. To increase the nominal voltage, these batteries comprise a plurality of series-connected individual cells. Due to the manufacture, the individual cells show fluctuations in capacity and internal resistance. This leads to the possibility that the cells may assume critical charged states during charging and discharging. Thus, there is a risk of deep discharge during discharge, and with the charging of same cutoff voltage is not reached during the joint charging of the cells, which may, in turn, lead to the overcharging of individual cells. In order to avoid these critical states, so-called balancers are installed, which balance out the critical charged states in the individual cells.

However, the lithium polymer batteries have the drawback that they are mechanically, electrically and thermally sensitive. Damage, overcharging, deep discharge, excessively high currents, operation at excessively high or excessively low temperatures and prolonged storage in the discharged state damage or destroy the cell. The batteries may swell and explode on overcharging and ignite in the process. These hazardous properties of the lithium polymer batteries lead to severe airplane accidents especially in case of transportation onboard airplanes. It was determined that the lithium polymer batteries may reach temperatures of up to 600° C. in case of unsuitable packaging and may ignite not only themselves but also the area surrounding them.

Standards have therefore been set up for the aforementioned reasons for the transportation onboard airplanes. Thus, such batteries may only be transported onboard airplanes if their maximum output does not exceed 100 Wh and in special battery packs supplied by the manufacturer or in commercially available special battery packs only. The battery packs for consumer devices contain a protective circuit developed for the particular battery against low voltage and excess current, and the cell and charge management should be integrated in the consumer, and a special lithium polymer battery-charging device must be available.

The user of a consumer device, for example, of an electrically operated mountain bike or of a model airplane, who wants to ride in a foreign country or participate in a competition, will face transportation problems under the conditions described, and these problems can be solved with a great effort only. The lithium polymer batteries can be transported individually in the special packagings supplied by the manufacturer. The battery systems comprising these must be taken apart for this and put together again and electrically connected on the site. This is complicated, time-consuming, and dangerous for a lay person. In addition, not all users have the electrotechnical expertise necessary for this. The batteries may become damaged already during disassembly if the procedure was not performed in a professional manner and properly if contacts are poled incorrectly or short-circuits are generated by contacting wires of opposite poles. This involves not only the risk that the batteries will be destroyed but also the risk that persons may suffer electric shocks hazardous for health. Therefore, transportation as air freight is no longer allowed for the current battery systems as a compact pack.

SUMMARY OF THE INVENTION

An object of the present invention was therefore to find a container for mounting a battery system, in which an electrotechnical lay person can arrange a plurality of lithium polymer batteries with current and balancer terminals and subsequently connect them with one another by plug-type connections, where the plug-type connections cannot be transposed by mistake, which is light-weight, compact and cost-effective and makes it possible for the user to assemble and disassemble the battery system easily and in a time-saving manner, whose individual transportation, especially by airplane, is possible without hazards and according to regulations, whose housing parts can be connected exclusively by screwing, clamping and pushing, and, finally, a plug-type connection that is suitable for high electric loads and is of high quality in respect to safety engineering is created for the central cable carrying current from the battery system to the consumer, whose current-carrying parts, such as poles and jacks are replaceable in case of wear without the plug-type connection having to be replaced in its entirety.

The object is accomplished, according to the invention, by a two-part battery housing being equipped by the user with a plurality of commercially available lithium polymer batteries and by the multipolar balancer plugs being connected via a balancer rail and multipolar jacks that are arranged thereon and are compatible with the balancer plugs with a central balancer cable, by the two-pole plugs being connected via two-pole plugs via bus bars with coupling elements and jacks compatible with the two-pole plugs with a central leading-out power cable by plug-type connections to form a battery system and by the battery system being able to be connected via the central balancer cable with a balancer plug by plug-type connection to a charging station or, via a connector plug connected to the leading-out power cable, to a consumer via a plug-type connection each.

The design embodiment of the plug-in system according to the present invention for combining a plurality of lithium polymer batteries to form a battery system has the advantage that the assembly and disassembly of a plurality of lithium polymer batteries with current and balancer terminals can be carried out separately to form a battery system of the type described even by a lay person who is not familiar with electrical engineering. This is possible especially due to the battery housing being designed with a plurality of battery compartments and due to the arrangement of a balancer rail with multipolar jacks, to which the connection of the balancer terminal of the batteries and a central balancer cable and the connection of the leading-out power cables via bus bars, whose coupling elements and jacks up to the central leading-out power cable can be established exclusively by plug-type connections, whose poles cannot be transposed by mistake. This prevents during disassembly and assembly the batteries from becoming damaged in case of unprofessional and improper procedure if contacts are poled incorrectly or short-circuits are generated by the contact of wires having opposite poles. Not only the risk of destruction of the batteries is eliminated. Damage to persons which is hazardous to health, which is caused by electric shocks in case of short-circuits, is eliminated as well.

It shall be stressed, in particular, that a circuit, which can be used as a balancer, for voltage measurement, for current compensation and thus for charging the full capacity of every individual cell in the lithium polymer batteries during the charging process, can be arranged in the battery housing. This offers the advantage that the user is not dependent on the presence of a charging device with a built-in balancer or on a separate balancer for charging the battery system. The management of the balancer may be arranged separately in the battery housing or it may even be arranged on the balancer rail.

It should be stressed, besides, that the storage and output capacities of the battery system are to be adapted to the field of application by selecting the type and number of the lithium polymer batteries, and the electrical connections can be connected by series or parallel connection as needed. The user of a consumer device can expand in this manner the output parameters of the battery system with additional lithium polymer batteries by adding batteries later. A stepwise addition of lithium polymer batteries or adaptation of the battery system to the necessary output parameters of different consumers is thus possible.

It is, of course, also possible to insert and use other commercially available, lithium-containing batteries in the battery housing according to the present invention instead of the lithium polymer batteries.

The battery housing, according to another aspect of the invention, is comparatively light-weight, compact and cost-effective and enables the user to assemble and disassemble the battery system easily and in a time-saving manner, but also safely. The battery housing is very advantageous and user-friendly.

The individual transportation of the lithium polymer batteries in the special packagings supplied by the manufacturer or purchased later commercially and separately of the battery housing equipped according to the present invention especially in airplanes is guaranteed in this manner without hazards and according to regulations.

It should be stressed, in particular, that the plug-type connection according to the present invention between the central leading-out power cable and a consumer, according to another aspect of the invention, is characterized in that the connection between a central leading-out power cable of the battery system and a consumer is established with a plug-type connection, which is formed from a connector plug and a compatible socket, which have a plug housing with two sleeves made separately in one next to each other with different outer contours and a jack housing compatible therewith with two cylinders recessed next to one another with different outer contours each; that two hexagons recessed separately next to each other on the end face, which can each be closed with a closing part with cable guides formed integrally in one piece towards the outside, are arranged for receiving binding posts in the plug housing and the jack housing; and that pole pins that can be mounted detachably from the outside are arranged in the plug housing on each binding post and jacks, which can be detachably mounted from the outside and are completely enveloped by the sleeves and the compatible cylinders formed integrally in one piece, are arranged in the jack housing.

Due to this design of the housing and the shape of the current-carrying parts, a plug-type connection that is suitable for high electric loads and is of high quality in respect to safety engineering is available for the user and a consumer.

Furthermore, very advantageous is the design of the current-carrying parts to be used according to another aspect of the invention, which is characterized in that the binding post has the shape of a hexagon nut, in the wall of which a threaded hole is arranged radially, in which a wire each of the central leading-out power cable can be fastened by means of a screw and an external thread is formed integrally in one piece on the end face thereof in the axial direction, and that the pole pin is provided with an attached spring element and with an end-side hexagonal opening as well as with an internal thread arranged on the opposite end face, and the jack is provided with an end-side internal thread and with a hexagonal opening arranged within the jack, and the pole pins and jacks can be screwed onto the external thread of each binding post within the housing sleeves of the housing plug and within the cylinders of the housing jacks by means of the respective internal thread from the outside.

The arrangement of the current-carrying parts, such as poles and jacks, in the plug-type connection guarantees their replacement in case of wear without having to replace the plug-type connection in its entirety. It should also be mentioned, in particular, that the wire connection to the central leading-out power cable of the battery system does not have to be loosened when replacing worn current-carrying parts.

The present invention shall be described in more detail below on the basis of two exemplary embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a top view of the equipped receiving part of the battery housing according to the present invention in the open state;

FIG. 2 is the top view of the closing part of the battery housing according to the present invention in the open state;

FIG. 3 is a perspective view of a lithium polymer battery with balancer cable with a multipolar balancer plug and leading-out power cable with a two-pole plug;

DESCRIPTION OF THE PREFERRED EMBODIMENTS

Figure 11:
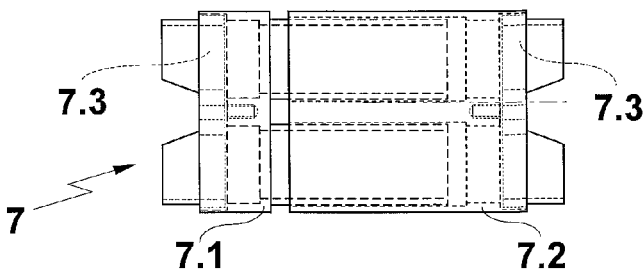
FIG. 11 is a front view of an empty plug-type connection comprising a connector plug, jack and closing elements.

Referring to the drawings, in the exemplary embodiment according to FIG. 1, the top view shows an open receiving element 1.1 of the battery housing 1, which has essentially a rectangular shape and extends trapezoidally on a narrow side. Preferably eight battery compartments 1.1.1, which are equipped, for example, according to FIG. 3, with a lithium polymer battery 2 alternatingly with four and five cells each and with a balancer cable 2.1 each having a four-pole and five-pole balancer plug 2.1.1 and with a leading-out power cable 2.2 having a two-pole plug 2.2.1, are arranged in the receiving part 1.1. A balancing rail 3, designed, for example, as a board, is formed under the battery compartments 1.1.1, and the electric connections for four three-pole and four five-pole jacks 3.1, which preferably alternate with one another, are arranged on the board 3, and the terminals of these jacks 3.1 open into a central balancer cable 4 with a multipolar balancer plug 4.1, which can be led out of the balancer rail 3 on the end side. In addition, an electric connection of a balancer to the balancer cables 2.1, which electric connection is not shown more specifically in the drawings, can be preferably arranged on the board of the balancer rail 3, and this electric connection measures the voltage in the individual cells of the batteries 2 during the charging, effects current compensation and guarantees that all the cells are charged with full capacity. The arrangement of this balancer may also be at another site of the housing if necessary or may be eliminated if the user already has a special charging device with built-in balancer and wants to use same. The receiving area 1.1.2 is arranged under the balancer rail 3, with the bus bars 5, not shown more specifically in the drawings, on which preferably two coupling elements 5.1 are arranged, extending in the receiving area 1.1.2, with only one coupling element 5.1 being shown in the drawing for clarity's sake. The coupling elements 5.1 have a number of jacks 5.1.1, which are compatible with four of the two-pole power plugs 2.2.1 each of the lithium polymer battery 2 and can be connected with the two-pole plugs 2.2.1 of the leading-out power cables 2.2 in series or in parallel with the compatible jacks 5.1.1 as needed by plug-type connection. The bus bars 5 are connected with a connector plug 6.1, which is led out of the receiving area 1.1.2 on the end side, with a central leading-out power cable 6, besides with the coupling elements 5.1. The central leading-out power cable 6 is bridged over by a fuse 8 in a cable lead-out area 1.1.3. The central balancer cable 4 with the multipolar balancer plug 4.1 and the central leading-out power cable 6 with the connector plug 6.1 are led out of the battery housing 1 via the cable lead-out area 1.1.3 and a cable lead-out strip 1.1.3.1. Sealing and closing elements 8, not shown more specifically in the drawings, are attached to the contour edges of the receiving part 1.1. According to FIG. 2, the closing part 1.2 of the battery housing 1 is equipped with preferably eight partitions 1.2.1, between which insulating surfaces 1.2.2 are arranged. A cable lead-out strip 1.2.3 is attached at the trapezoidally terminating end of the closing part 1.2 and sealing and closing elements 8, which are compatible with the parts of the receiving part 1.1 that are located under it, are attached to the contour edges of the closing part 1.2. The closing part 1.2 is attached now to the receiving part 1.1 of the battery housing 1 and the sealing and closing parts 8 are plugged one into another and locked. The battery system 0 completed according to the present invention can be connected now to a consumer, for example, to an electrically driven bicycle, with a connector plug 6.1 via the central leading-out power cable 6 protruding from the battery housing 1 and operated by the battery system 0. When the output of the battery system 0 drops, it can be removed from the consumer and connected to a corresponding charging device with the central balancer cable 4 protruding from the battery housing 1 and recharged.

Figure 4:
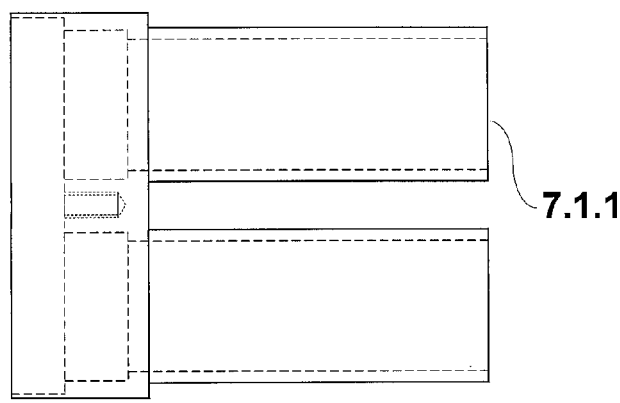
FIG. 4 is a front view of the empty plug housing.
Figure 5:
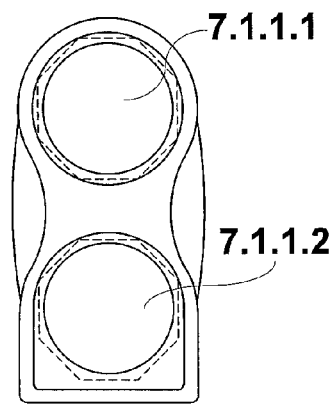
FIG. 5 is a top view of the empty plug housing from the plug-in side.
Figure 6:
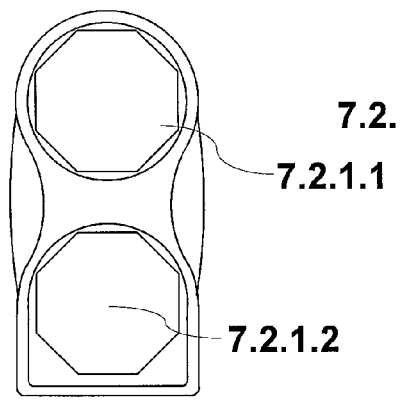
FIG. 6 is a top view of the empty jack housing from the plug-in side.
Figure 7:
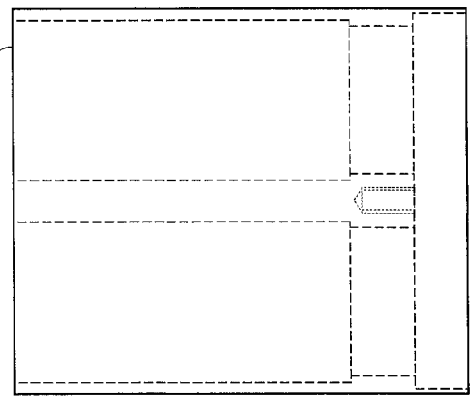
FIG. 7 is a front view of the empty jack housing.
Figure 8:
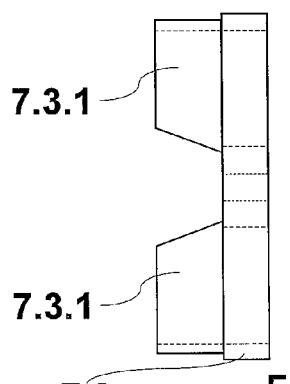
FIG. 8 is a side view of the closing part.
Figure 9:
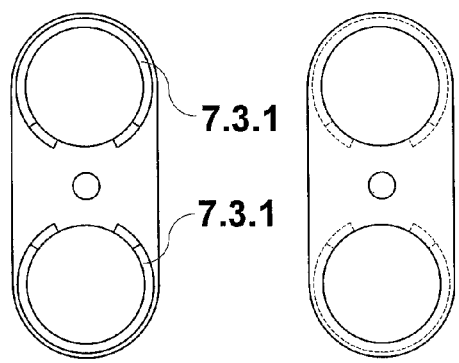
FIG. 9 is a top view of the closing part from the side of the cable duct.
Figure 10:
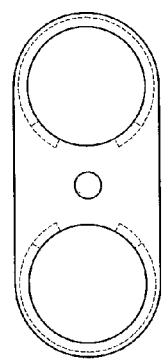
FIG. 10 is a top view of the closing part from the side of the housing seat.
Figure 12:
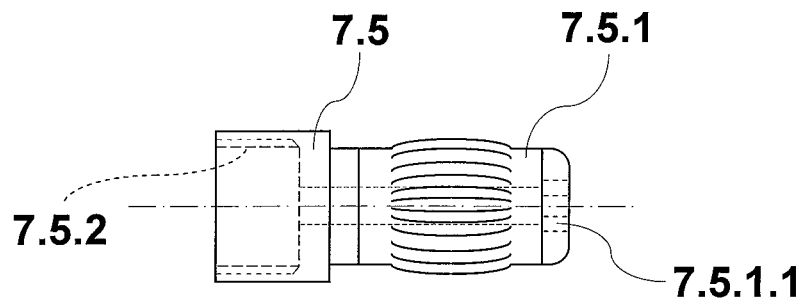
FIG. 12 is a side view of the pole pin with the spring element attached.
Figure 13:
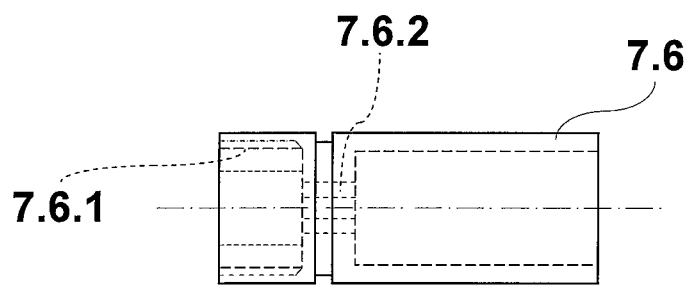
FIG. 13 is a side view of a jack.
Figures 14, 15:
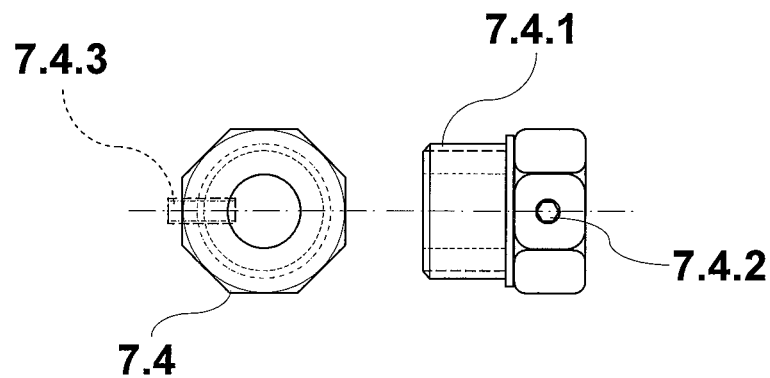
FIG. 14 is a top view of the binding post.
FIG. 15 is a side view of the binding post.

The above-described battery housing 1 and its outfitting can be assumed in the second exemplary embodiment. As a connecting element between the battery system 0 and a consumer, a plug-type connection 7 was connected in this example according to FIG. 11 with a connector plug 7.1 to the central leading-out power cable 6, and a socket 7.2 was installed at the drive of the consumer. The connector plug 7.1 of the plug-type connection comprises, according to FIG. 4 and FIG. 5, a plug housing 7.1.1 with two sleeves 7.1.1.1 and 7.1.1.2 formed in one piece separately next to each other, which have different outer contours. A hexagon each is recessed next to each other on the end face for receiving a binding post 7.4. The socket 7.2 comprises, according to FIG. 6 and FIG. 7, a through jack housing 7.2.1, in which two cylinders 7.2.1.1 and 7.2.1.2 with different inner contours are recessed separately next to each other. A hexagon each is recessed separately next to each other in the jack housing 7.2.1 on the end face for receiving a binding post 7.4. The plug housing 7.1.1 and the jack housing 7.2.1 are closed at the cable lead-in and lead-out ends, according to FIG. 8, FIG. 9 and FIG. 10, with a closing part 7.3 each with cable ducts 7.3.1 formed integrally in one piece, preferably by screwing. The housing parts of the plug-type connection 7 preferably consist of a low-wear, heavy-duty plastic. FIG. 14 and FIG. 15 show a binding post 7.4, which preferably has the shape of a hexagon nut, on one end face of which a threaded hole 7.4.2 is formed integrally in one piece. A threaded hole 7.4.2, into which a screw 7.4.3 can be screwed for fastening one of the respective cable wires, is arranged radially in the wall of the hexagon nut. FIG. 12 shows a pole pin 7.5. The pole pins 7.5 are cylindrical hollow bodies, at one end of which an internal thread 7.5.2 is arranged, and to the lower half of which a spring element 7.5.1, which has a central hexagonal opening 7.5.1.1, is attached. The jack 5.6 according to FIG. 13 is a cylindrical hollow body with an internal thread 7.6.1 formed integrally in one piece on the end face, which internal thread ends with a radially recessed hexagonal opening 5.6.2. The current-carrying parts of the connector plug 7.1 and of the socket 7.2 preferably consist of a material with good conductivity, for example, copper. The plug-type connection 7 is mounted s follows:

The central leading-out power cable 6 is led through the closing part 7.3. A bared wire end of the cable 6 is inserted into a binding post 7.4 and is fixed there by screwing with the screw 7.4.3 in the binding post 7.4. The second bared wire end of the cable 6 is then fixed by screwing in a second binding post 7.4 in the manner described. The two binding posts 7.4 connected with the wire ends of the leading-out power cable are pressed each into a hexagon of the plug housing 7.1.1 and the still loose closing part 7.3 seated on the cable 6 is pressed onto the two binding posts 7.4 into the end face of the plug housing 7.1.1 and preferably screwed on. A pole pin 7.5 each is now inserted with the end in which the internal thread 7.5.2 is arranged into the sleeves 7.1.1.1 and 7.1.1.2 and screwed onto the respective external thread 7.4.1 of the two binding posts 7.4 until the pole pins 7.5 become covered by the sleeves 7.1.1.1 and 7.1.1.2 ad are no longer visible from the outside. The pole pins 7.5 are screwed in by means of a hexagon wrench, which is inserted into the hexagonal opening 7.5.1.1 of the pole pin 7.5 and can be turned with the pole pin 7.5 to the stop and can thus be screwed in tightly.

The current-drawing cable of the consumer is led through the closing part 7.3. A bared wire end of the current-drawing cable is inserted into a binding post 7.4 and fixed there by screwing with the screw 7.4.3 in the binding post 7.4. The second bared wire end of the cable 6 is then fixed by screwing in a second binding post 7.4 in the manner described. The two binding posts 7.4 are pressed each into a hexagon of the jack housing 7.3, and the closing part 7.3, still seated loosely on the current-drawing cable of the consumer, is pressed onto the two binding posts 7.4 into the end face of the jack housing 7.1.2 and preferably screwed on. One jack 7.6 each is inserted now with the end in which the internal thread 7.6.1 is arranged into the cylinders 7.2.1.1 and 7.2.1.2 of the jack housing 7.2 and screwed onto the respective external thread 7.4.1 of the two binding posts 7.4 until the jacks 7.6 become covered by the cylinders 7.2.1.1 and 7.2.1.2 and are no longer visible from the outside. The jacks 7.6 are screwed in by means of a hexagon wrench, which is inserted into the hexagonal opening 7.6.2 in the interior of the jack 7.6 and with which the jack 7.6 can be turned to a stop and can thus be fixed by screwing. The connector plug 7.1 mounted on the central leading-out power cable 6 of the battery system 0 can be connected now to the plug-type connection 7 with the socket 7.2 on the current-drawing cable of the consumer.

Due to constant charging and discharging of the battery system 0, the current-carrying parts of the plug-type connection are subject to great mechanical wear, which leads to an increase in the temperature of the plug-type connection 7 and an increase in resistance, which may lead to a drop in the output of the battery system 0. The worn parts, such as the pole pins 7.5 and the jacks 7.6, can be screwed out of the plug housing 7.1.1 and the jack housing 7.1.2 in this case with the above-described hexagon box wrench and replaced with new parts, which leads to great cost savings for the user, because the housing parts of the plug-type connection do not need to be removed and replaced. In addition, the wires of the respective cables do not have to be loosened during the replacement of the pole pins 7.5 and jacks 7.6.

While specific embodiments of the invention have been shown and described in detail to illustrate the application of the principles of the invention, it will be understood that the invention may be embodied otherwise without departing from such principles.

List of Reference Numbers Used

| | |
|---|---|
| 0 | Battery system |
| 1 | Battery housing |
| 1.1 | Receiving part |
| 1.1.1 | Battery compartments |
| 1.1.2 | Receiving area |
| 1.1.3 | Cable lead-out area |
| 1.1.3.1 | Cable lead-out strip |
| 1.2 | Closing part |
| 1.2.1 | Partitions |
| 1.2.2 | Insulating surfaces |
| 1.2.3 | Cable lead-out strip |
| 2 | lithium polymer battery |
| 2.1 | balancer cable |
| 2.1.1 | balancer plug |
| 2.2 | power cable |
| 2.2.1 | two-pole plug |
| 3 | Balancer rail |
| 3.1 | Multipolar jack |
| 4 | Central balancer cable |
| 4.1 | Balancer plug |
| 5 | Bus bar |
| 5.1 | Coupling elements |
| 5.1.1 | Jacks |
| 6 | Central leading-out power cable |
| 6.1 | Connector plug |
| 7 | Plug-type connection |
| 7.1 | Connector plug |
| 7.1.1 | Plug housing |
| 7.1.1.1 | Sleeve |
| 7.1.1.2 | Sleeve |
| 7.2 | Socket |
| 7.2.1 | Jack housing |
| 7.2.1.1 | Recessed cylinder |
| 7.2.1.2 | Recessed cylinder |
| 7.3 | Closing part |
| 7.3.1 | Cable duct |
| 7.4 | Binding post |
| 7.4.1 | External thread |
| 7.4.2 | Threaded hole |
| 7.4.3 | Screw |
| 7.5 | Pole pin |
| 7.5.1 | Spring element |
| 7.5.1.1 | Hexagonal opening |
| 7.5.2 | Internal thread |
| 7.6 | Jack |
| 7.6.1 | Internal thread |
| 7.6.2 | Hexagonal opening |
| 8 | Sealing and closing elements |
| 9 | Fuse |

What is claimed is:

1. A plug-in system for combining lithium polymer batteries and for connecting same to form a battery system for driving a consumer, the plug-in system comprising:
   a battery housing for receiving a plurality of individual lithium polymer batteries, each with a battery leading-out power cable, having a battery two-pole plug, and each with a battery balancer cable, having multipolar balancer plug, the battery housing being a two-part battery housing for receiving the plurality of commercially available lithium polymer batteries;
   a balancer rail with multipolar balancer rail jacks connected thereto, the multipolar balancer rail jacks being compatible with the multipolar balancer plugs;
   a central balancer cable connected to the balancer rail and having a balancer plug;
   a bus bar with a bus bar coupling element having bus bar two-pole plug compatible jacks for connection with the battery two-pole plugs;
   a central leading-out power cable connected to the bus bar to form a battery system, the central leading-out power cable having a connector plug, wherein the battery system is plug connectable to a charging station via the balancer plug and the central balancer cable or is plug connectable to a consumer via the connector plug and the leading-out power; and a circuit, which can be used as a balancer, for voltage measurement, for current compensation and hence for charging the full capacity of every individual cell in the lithium polymer batteries during the charging operation, the circuit being arranged in the battery housing, wherein:

the storage and output capacities of the battery system is adaptable to a particular field of application by selecting a type and a number of the lithium polymer batteries; and battery electric connections can be configured as series or as parallel connection as needed.

2. A plug-in system for combining lithium polymer batteries and for connecting same to form a battery system for driving a consumer in accordance with claim 1, further comprising a cable lead-out strip wherein:

the battery housing is formed from a receiving part and a closing part;

the receiving part is equipped with a plurality of battery compartments, which compartments are separated from one another and are open at a top, with the balancer rail, with the central balancer cable with balancer plug, with a receiving area with the bus bars, with the central leading-out power cable with the connector plug, as well as with a cable lead-out area with the cable lead-out strip and with sealing and closing elements on the edges of the receiving part.

3. A plug-in system for combining lithium polymer batteries and for connecting same to form a battery system for driving a consumer in accordance with claim 2, wherein the closing part of the battery housing with the battery compartments of the receiving part has corresponding partitions and insulating surfaces arranged therein and a cable lead-out strip, which corresponds to the cable lead-out strip of the receiving part and is equipped with the sealing and closing elements on the edges of the closing part.

4. A plug-in system for combining lithium polymer batteries and for connecting same to form a battery system for driving a consumer in accordance with claim 2, wherein the balancer rail is a board, on which the electric connections between the multipolar balancer plugs, the multipolar jacks and the central balancer cable are arranged, which is arranged under the battery compartments, and the battery compartments can be separated in space from the receiving area of the receiving part.

5. A plug-in system for combining lithium polymer batteries and for connecting same to form a battery system for driving a consumer in accordance with claim 2, further comprising another bus bar wherein at least two bus bars are arranged in the receiving area of the receiving part with at least two coupling elements and jacks each as a counterpiece to the battery two-pole plugs of the power cables, via which a connection of the lithium polymer batteries with the central leading-out power cable can be established with the connector plug.

6. A plug-in system for combining lithium polymer batteries and for connecting same to form a battery system for driving a consumer in accordance with claim 2, wherein:

the central leading-out power cable is bridged over in the cable lead-out area by a fuse; and the central leading-out power cable with the connector plug as well as the central balancer cable with the balancer plug can be led out of the battery housing via the cable lead-out strip in a stable manner.

7. A plug-in system for combining lithium polymer batteries and for connecting same to form a battery system for driving a consumer in accordance with claim 1, wherein after being equipped with the lithium polymer batteries and after leading out the plug-type connections of the balancer cables via the multipolar balancer plugs thereof via the multipart balancer jacks of the balancer rail to the central balancer cable as well as the plug-type connections of the two-pole power cables with the two-pole plugs, via the bus bar, the coupling elements thereof with the two-pole jacks to the central leading-out power cable, the central balancer cable with the balancer plug is clamped into the cable lead-out strip of the receiving part and can be plugged onto the cable lead-out strip of the receiving part by attaching the closing part and the cable lead-out strip thereof, and can be closed via the sealing and closing elements of the receiving part and of the closing part.

* * * * *